(12) United States Patent
Ishikawa et al.

(10) Patent No.: US 11,171,591 B2
(45) Date of Patent: Nov. 9, 2021

(54) APPARATUS FOR CONTROLLING ROTARY ELECTRIC MACHINE

(71) Applicant: DENSO CORPORATION, Kariya (JP)

(72) Inventors: Akeru Ishikawa, Kariya (JP); Takuya Kawamura, Kariya (JP); Hideaki Nakayama, Kariya (JP); Koji Irie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/838,324

(22) Filed: Apr. 2, 2020

(65) Prior Publication Data

US 2020/0235688 A1 Jul. 23, 2020

Related U.S. Application Data

(63) Continuation of application No. PCT/JP2018/035731, filed on Sep. 26, 2018.

(30) Foreign Application Priority Data

Oct. 10, 2017 (JP) .............................. JP2017-197144

(51) Int. Cl.
*H02P 6/00* (2016.01)
*H02P 21/22* (2016.01)
*H02P 25/024* (2016.01)
*B60L 9/18* (2006.01)
*H02P 9/04* (2006.01)

(52) U.S. Cl.
CPC ................. *H02P 21/22* (2016.02); *B60L 9/18* (2013.01); *H02P 9/04* (2013.01); *H02P 25/024* (2016.02)

(58) Field of Classification Search
CPC ........ H02P 21/00; H02P 21/22; H02P 25/024; H02P 7/06; H02P 2101/45; H02P 9/04; H02P 27/06; B60L 9/18
See application file for complete search history.

(56) References Cited

U.S. PATENT DOCUMENTS

| 2004/0038775 A1* | 2/2004 | Shimizu | ................. B60K 23/08 477/6 |
|---|---|---|---|
| 2006/0192510 A1 | 8/2006 | Okazaki et al. | |
| 2007/0182349 A1 | 8/2007 | Fujita et al. | |

FOREIGN PATENT DOCUMENTS

JP 2005-050712 A 2/2005

* cited by examiner

*Primary Examiner* — Karen Masih
(74) *Attorney, Agent, or Firm* — Oliff PLC

(57) ABSTRACT

A control apparatus sets a value of the field current command and a value of the armature related command in accordance with drive information and the setting information stored in the storage unit; the value of the field current command and the value of the armature related command correspond to the obtained drive information. The control apparatus controls a field current flowing through the field winding to the set value of the field current command, and controls a current flowing through the armature winding or a voltage applied to the armature winding to the set value of the armature related command.

8 Claims, 6 Drawing Sheets

APPARATUS FOR CONTROLLING ROTARY ELECTRIC MACHINE

CROSS REFERENCE TO RELATED APPLICATION

This application is a bypass continuation application of currently pending international application No. PCT/JP2018/35731 filed on Sep. 26, 2018 designating the United States of America, the entire disclosure of which is incorporated herein by reference. The internal application is based on and claims the benefit of priority from Japanese Patent Application No. 2017-197144 filed on Oct. 10, 2017, the disclosure of which is incorporated in its entirety herein by reference.

TECHNICAL FIELD

The present disclosure relates to apparatuses for controlling a rotary electric machine including a rotor equipped with a field winding.

BACKGROUND

Conventional control apparatuses control a permanent-magnet field rotary electric machine, an example of which adjusts a first current component and a second current component contained in currents flowing through an armature winding of a stator; the first current component contributes to generation of torque, and the second current component contributes to generation of a magnetic field.

SUMMARY

An apparatus includes a command setter configured to set a value of a field current command and a value of an armature related command in accordance with drive information obtained by a drive information obtainer and setting information stored in a storage unit. The value of the field current command and the value of the armature related command set by the command setter correspond to the obtained drive information.

The apparatus includes a field controller configured to control a field current flowing through a field winding to the value of the field current command set by the command setter. The apparatus includes an armature controller configured to control the current flowing through the armature winding or the voltage applied to the armature winding to the value of the armature related command set by the command setter.

DESCRIPTION OF EMBODIMENTS

Viewpoint

Figure 1:
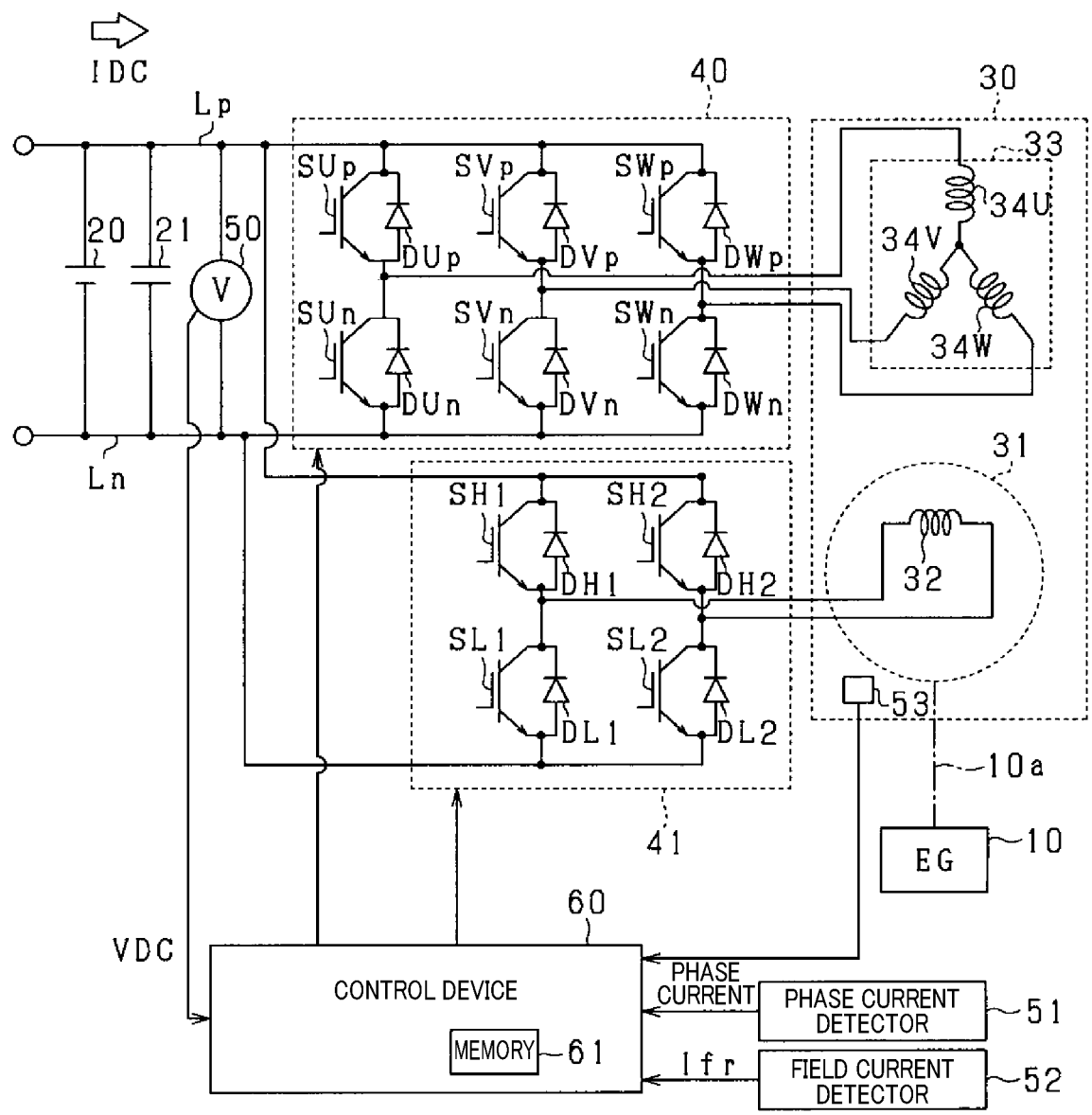
FIG. 1 is an overall structural diagram illustrating an example of the structure of a vehicular system according to the first embodiment of the present disclosure.

Conventional control apparatuses control a permanent-magnet field rotary electric machine, an example, an example of which is disclosed in Japanese Patent Application Publication No. 2006-238631, control a permanent-magnet field rotary electric machine. The control apparatus disclosed in the patent publication adjusts a first current component and a second current component contained in currents flowing through an armature winding of a stator; the first current component contributes to generation of torque, and the second current component contributes to generation of a magnetic field. This adjustment causes the generated torque to follow a torque command value.

The control apparatus disclosed in the patent publication also controls the respective currents flowing through the armature winding to thereby efficiently drive the rotary electric machine.

There are wound-field rotary electric machines, each of which includes a stator equipped with a field winding. Users for such a wound-field rotary electric machine desire a more efficient drive of the wound-field rotary electric machine in accordance with requested torque for the rotary electric machine.

In view of the circumstances set forth above, one aspect of the present disclosure seeks to provide apparatuses for controlling a wound-field rotary electric machine whose rotor includes an armature winding, each of which is capable of more efficiently driving a wound-field rotary electric machine in accordance with requested torque for the wound-field rotary electric machine.

For addressing the circumstances, according to an exemplary aspect of the present disclosure, there is provided an apparatus for controlling a rotary electric machine. The apparatus is applicable to a control system that includes a rotary electric machine and a power converter. The rotary electric machine includes a field winding provided to a rotor, and a stator winding provided to a stator. The power converter is configured to supply alternating-current power to the rotary electric machine to thereby drive the rotary electric machine. The apparatus includes a storage unit that stores setting information including a correlation between (1) A combination of an armature related command and a field current command (2) Drive information including request torque The armature related command is a command for a current flowing through the armature winding or a voltage applied to the armature winding, and the setting information enables torque of the rotary electric machine to be adjusted to the request torque.

The apparatus includes a drive information obtainer configured to obtain the drive information.

The apparatus includes a command setter configured to set a value of the field current command and a value of the armature related command in accordance with the drive information obtained by the drive information obtainer and the setting information stored in the storage unit.

The value of the field current command and the value of the armature related command set by the command setter correspond to the obtained drive information.

The apparatus includes a field controller configured to control a field current flowing through the field winding to the value of the field current command set by the command setter.

The apparatus includes an armature controller configured to control the current flowing through the armature winding or the voltage applied to the armature winding to the value of the armature related command set by the command setter.

There are combinations between values of the armature related command and the field winding command, which are required to adjust the torque of the rotary electric machine to the request torque. Under the circumstances, the present application focuses on the fact that there is a value of the armature related command in accordance with the magnitude of the field current, which enables a value of the efficiency of the rotary electric machine to be as high as possible.

From this viewpoint, the present disclosure obtains, based on the drive information including the request torque and the setting information stored in the storage unit, a combination of a value of the field current command and a value of the armature related command; the combination enables the torque of the rotary electric machine to be adjusted to the request torque.

This defines the combination of the value of the field current command and the value of the armature related command, which enables the rotary electric machine to be driven with a higher value of the efficiency of the rotary electric machine. This therefore makes it possible to drive the rotary electric machine efficiently in accordance with the request torque.

EMBODIMENTS

First Embodiment

From this viewpoint, the following describes the first embodiment configured such that a control apparatus according to the present disclosure is installed in a vehicle with reference to the accompanying drawings.

Referring to FIG. 1, the vehicle includes an engine 10. The engine 10 includes, for example, a fuel injector and an output shaft 10a, and is configured such that a controlled amount of fuel, such as gasoline or gas oil, sprayed from the fuel injector. This burns the controlled amount of fuel, thus generating power. The engine 10 outputs the generated power from the output shaft 10a of the engine 10.

Additionally, the vehicle includes a battery 20 serving as a direct-current (DC) power source and a control system.

The battery 20 is, for example, a lead acid battery having a rated voltage of, for example, 20 V.

The control system includes an alternating-current (AC) driven rotary electric machine 30, an inverter 40, a field energization circuit 41, and a capacitor 21. The inverter 40 serves as a power converter.

The first embodiment uses a wound-field synchronous rotary electric machine as the rotary electric machine 30. In particular, the rotary electric machine 30 serves as, for example, an integrated starter-generator (ISG) that serves as a power generator having a motor function.

The rotary electric machine 30 includes a rotor 31 and a stator 33. The rotor 31 includes a field winding 32 through which a field current Ifr can flow.

The stator 33 includes an armature winding that induces a rotating magnetic field that rotates the rotor 31. The armature winding is comprised of three-phase, i.e. U-, V-, and W-phase, coils 34U, 34V, and 34W that are arranged to have a phase difference of, for example, 120 electrical degrees from each other. The rotor 31 has a rotating shaft coupled to the output shaft 10a of the engine 10 via, for example, an unillustrated pulley.

When the rotary electric machine 30 is driven as a power generator, rotational power supplied from the output shaft 10a causes the rotor 31 to rotate, resulting in the rotary electric machine 30 generating electrical power. The generated electrical power charges the battery 20.

In contrast, when the rotary electric machine 30 is driven as a motor, rotation of the rotor 31 causes the output shaft 10a to rotate, thus giving rotational power to the output shaft 10a. Because driving wheels of the vehicle are coupled to the output shaft 10a via, for example, a transmission, the rotational power given to the output shaft 10a assists traveling of the vehicle.

The inverter 40 is configured to generate, based on DC power supplied from the battery 20, alternating-current (AC) power.

The inverter 40 includes U-, V-, and W-phase upper-arm switches SUp, SVp, and SWp, and U-, V-, and W-phase lower-arm switches SUn, SVn, and SWn.

The U-phase upper- and lower-arm switches SUp and SUn are connected to each other in series. The connection point through which the switches SUp and SUn are connected to each other in series is connected to a first end of the U-phase winding 34U.

Similarly, the V-phase upper- and lower-arm switches SVp and SVn are connected to each other in series. The connection point through which the switches SVp and SVn are connected to each other in series is connected to a first end of the V-phase winding 34V.

Additionally, the W-phase upper- and lower-arm switches SWp and SWn are connected to each other in series. The connection point through which the switches SWp and SWn are connected to each other in series is connected to a first end of the W-phase winding 34W.

Second ends of the three-phase windings 34U, 34V, and 34W are commonly connected to each other in, for example, star-configuration; the common connection point serves as a neutral point.

The first embodiment uses IGBTS as the respective switches SUp to SWn. To each of the U-, V-, and W-phase upper-arm switches SUp, SVp, and SWp, a corresponding one of U-, V-, and W-phase upper-arm diodes DUp, DVp, and DWp is connected in antiparallel. Similarly, to each of the U-, V-, and W-phase lower-arm switches SUn, SVn, and SWn, a corresponding one of U-, V-, and W-phase lower-arm diodes DUn, DVn, and DWn is connected in antiparallel.

The high-side terminals, i.e. the collectors, of the upper-arm switches SUp, SVp, and SWp are connected to the positive terminal of the battery 20 via a high-side electrical path Lp. The low-side terminals, i.e. the emitters, of the lower-arm switches SUn, SVn, and SWn are connected to the negative terminal of the battery 20 via a low-side electrical path Ln.

Each of the switches SUp to SWn has a control terminal, i.e. the gate, connected to the control device 60.

Each of the high- and low-side electrical paths Lp and Ln is comprised of an electrically conductive member, such as a busbar.

The capacitor 21 has opposing high- and low-side electrodes.

The high-side electrode of the capacitor 21 is connected to a first connection point of the high-side electrical path Lp; this first connection point of the high-side electrical path Lp is closer to the positive terminal of the battery 20 than the connection points on the high-side electrical path Lp to the collectors of the respective switches SUp, SVp, and SWp.

Similarly, the low-side electrode of the capacitor 21 is connected to a second connection point of the low-side electrical path Ln; this second connection point of the low-side electrical path Ln is closer to the negative terminal of the battery 20 than the connection points on the low-side electrical path Ln to the emitters of the respective switches SUn, SVn, and SWn.

Note that a current flowing from the first connection point on the high-side electrical path Lp, which is connected to the high-side electrode of the capacitor 21, to the collector of each of the upper-arm switches SUp to SWp will be referred to as an inverter current IDC. The direction of the inverter current IDC flowing from the first connection point to the collector of each of the upper-arm switches SUp to SWp is defined as a positive direction.

The field energization circuit 41 is configured to have a full bridge circuit structure.

Specifically, the field energization circuit 41 is comprised of a first series switch unit comprised of a first upper-arm switch SH1 and a first lower-arm switch SL1 connected to each other in series, and a second series switch unit comprised of a second upper-arm switch SH2 and a second lower-arm switch SL2 connected to each other in series. The connection point between the first upper- and lower-arm switches SH1 and SH2 is connected to a first end of the field winding 32 via an unillustrated brush unit. Similarly, the connection point between the second upper- and lower-arm switches SH1 and SL1 is connected to a second end of the field winding 32 via an unillustrated brush unit.

The first embodiment uses IGBTs as the respective first and second upper- and lower-arm switches SH1, SL1, SH2, and SL2.

The field energization circuit 41 also includes diodes DH1, DL1, DH2, and DL2 connected in antiparallel to the respective switches SH1, SL1, SH2, and SL2.

The high-side terminals, i.e. the collectors, of the first and second upper-arm switches SH1 and SH2 are commonly connected to a first point of the high-side electrical path Lp. The first point of the high-side electrical path Lp is located to be closer to the inverter 40 than the first connection point thereto. The low-side terminals, i.e. the emitters, of the first and second lower-arm switches SL1 and SL2 are commonly connected to a second point of the low-side electrical path Ln. The second point of the low-side electrical path Ln is located to be closer to the inverter 40 than the second connection point P2 thereto.

Additionally, the control system includes a voltage detector 50, a phase current detector 51, a field current detector 52, an angle detector 53, and a control device 60.

The voltage detector 50 is configured to measure a voltage across the capacitor 21 as a power supply voltage VDC.

The phase current detector 51 is configured to measure, for example, three phase currents flowing through the respective U, V- and W-phase windings 34U, 34V, and 34W.

The field current detector 52 is configured to measure a field current flowing through the field winding 32.

The angle detector 53 is configured to output, to the control device 60, an angular measurement signal indicative of a present value of an electrical rotational angle of the rotor 31 relative to a predetermined reference position.

Output signals from the respective detectors 50 to 53 are input to the control device 60.

The control device 60 is configured as, for example, a microcomputer. The control device 60 includes a memory 61 serving a storage unit.

The control device 60 calculates, based on the angular measurement signal, a rotational speed Nm of the rotor 31 and an electrical rotational angle $\theta e$ of the rotary electric machine 30.

Note that at least part of all functions provided by the control device 60 can be implemented by one or more hardware components, such as one or more integrated circuits. Each function of the control device 60 can be implemented by, for example, one or more software programs and a computer that executes the one or more software programs.

Next, the following describes how the control device 60 drives the inverter 40.

The control device 60 is configured to obtain the angular measurement signal output from the angle detector 53, and generate, based on the angular measurement signal, the drive signals for turning on or off the respective switches SUp to SWn constituting the inverter 40. That is, each drive signal for a corresponding one of the switches SUp to In particular, the control device 60 causes the rotary electric machine 30 to serve as a motor to (1) Generate the drive signals for individually turning on or off the respective switches SUp to SWn (2) Supply the drive signals SUp to SWn to the control terminals of the respective switches SUp to SWn to thereby cause the inverter 40 to convert the DC voltage output from the battery 20 into controlled three-phase AC voltages, thus supplying the three-phase AC voltages to the gates of the respective three-phase windings 34U, 34V, and 34W Additionally, the control device 60 causes the rotary electric machine 30 to serve as a generator to (1) Generate the drive signals SUp to SWn for individually turning on or off the respective switches SUp to SWn (2) Supply the drive signals to the control terminals of the respective switches SUp to SWn to thereby cause the inverter 40 to convert three-phase AC power supplied from the rotary electric machine 30 into controlled DC power, thus supplying the controlled DC power to at least one of the battery 20 and the at least one load 22

Next, the following describes how the control device 60 controls the field energization circuit 41.

The control device 60 is configured to control on-off switching operations of the respective switches SH1, SL1, SH2, and SL2 to thereby cause the first energization circuit 41 to alternately have a first switching mode, and have a second switching mode.

The first switching mode represents that the first upper-arm switch SH1 and the second lower-arm switch SL2 are in the on state, and the second upper-arm switch SH2 and the first lower-arm switch SL1 are in the off state. This causes the field current Ifr to flow through the field winding 32 from the first upper-arm switch SH1 to the second lower-arm switch SL2.

In contrast, the second switching mode represents that the first upper-arm switch SH1 and the second lower-arm switch SL2 are in the off state, and the second upper-arm switch SH2 and the first lower-arm switch SL1 are in the on state. This causes the field current Ifr to flow through the field winding 32 from the second upper-arm switch SH2 to the first lower-arm switch SL1.

Next, the following describes how the control device 60 performs first torque control, i.e. a first control mode.

Figure 2:
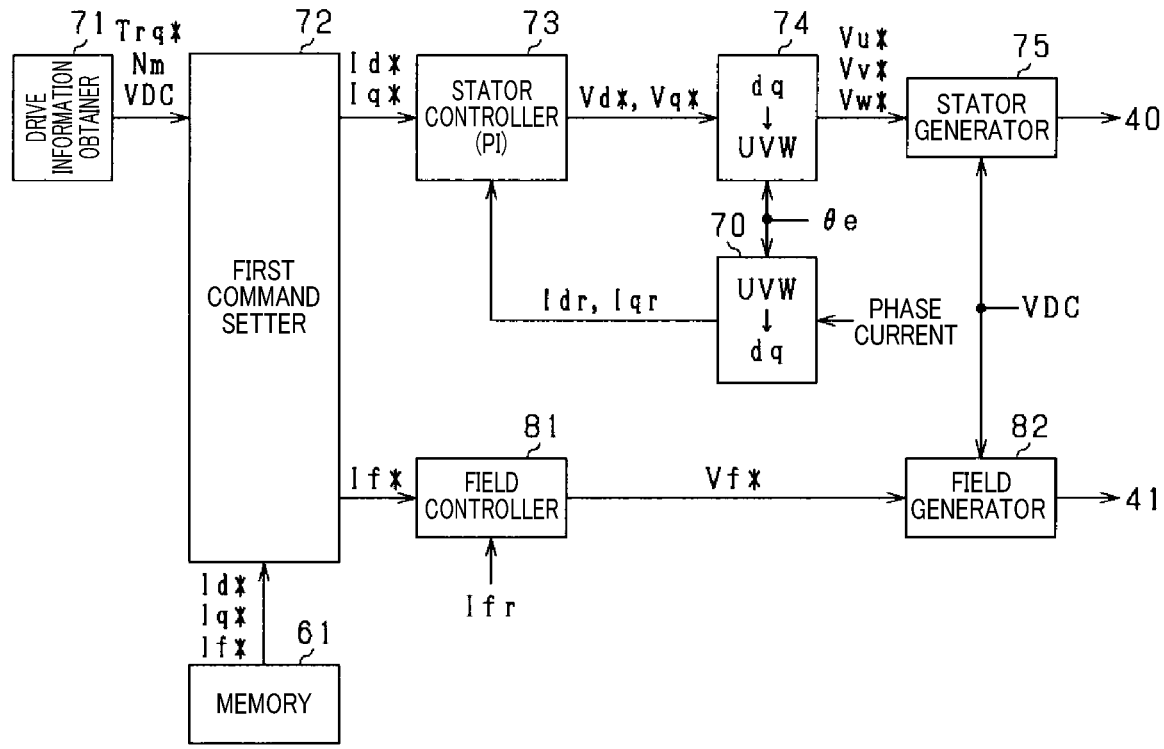
FIG. 2 is a block diagram for performing first torque control based on pulse-width modulation (PWM) control.

The control device 60 is configured to perform the first torque control illustrated in FIG. 2 upon a value of a modulation factor Mr of a voltage supplied from the inverter 40 to the rotary electric machine 30 being equal to or less than a predetermined threshold value of, for example, 1. The modulation factor Mr is defined by Vn/VDC where Vn represents the amplitude of a voltage vector supplied from the inverter 40 to the rotary electric machine 30, and VDC represents the power supply voltage set forth above.

The control device 60 is configured to perform PWM control to thereby generate the drive signals, each of which turns on or off of the corresponding one of the switches Sup to SWn of the inverter 40; the on-off switching operations of the switches Sup to SWn enable torque Trq of the rotary electric machine 30 to follow request torque Trq*.

In addition, the control device 60 performs known vector control that sets voltage commands, i.e. U-, V-, and W-phase voltage commands Vu*, Vv*, and Vw*, which are used to perform the PWM control.

A two-phase converter 70 converts the U-, V-, and W-phase currents IU, IV, and IW measured by the phase current detector 51 in a three-phase stationary coordinate system of the rotary electric machine 30 into a d-axis current Idr and a q-axis current Iqr in a d-q coordinate system, i.e. a two-phase rotation coordinate system, in accordance with the electrical rotational angle θe measured by the angle detector 53.

A drive information obtainer 71 obtains, i.e. measures, as drive information, a value of the request torque Trq*, a value of rotational speed Nm, and a value of power supply voltage VDC.

In the memory 61, first setting information is stored; this first setting information includes a correlation among a d-axis current command Id*, a q-axis current command Iq*, a field current command If*, and the drive information. For example, the first setting information is map information including a relationship among 1. Values of the d-axis current command Id*
2. Values of the q-axis current command Iq*
3. Values of the field current command If*
4. Values of each of the items, i.e. each of the request torque Trq*, the rotational speed Nm, and power supply voltage VDC, included in the drive information The d- and q-axis current commands Id* and Iq* correspond to one or more armature command values.

A first command setter 72 sets, based on a value of each item of the drive information obtained by the drive information obtainer 71 and the first setting information stored in the memory 61, values of the respective d-axis current command Id*, q-axis current command Iq*, and field current command If* for adjusting the torque of the rotary electric machine 30 to the request torque Trq*.

A stator controller 73 calculates a d-axis voltage command Vd* as a manipulated variable for feedback controlling the d-axis current Idr to the d-axis current command Id*. Specifically, the stator controller 73 subtracts, from the d-axis current command Id*, the d-axis current Idr to accordingly calculate a d-axis current deviation between the d-axis current command Id* and the d-axis current Idr. Then, the stator controller 73 calculates the d-axis voltage command Vd* for feedback controlling the d-axis current deviation to zero.

Similarly, the stator controller 73 calculates a q-axis voltage command Vq* as a manipulated variable for feedback controlling the q-axis current Iqr to the q-axis current command Iq*. Specifically, the stator controller 73 subtracts, from the q-axis current command Iq*, the q-axis current Iqr to accordingly calculate a q-axis current deviation between the q-axis current command Iq* and the q-axis current Iqr. Then, the stator controller 73 calculates the q-axis voltage command Vq* for feedback controlling the q-axis current deviation to zero.

Note that the amplitude Vn of the voltage vector serving as the basis of the modulation factor Mr can be calculated by the control device 60 based on the d- and q-axis voltage commands Vd* and Vq*.

Note that the stator controller 73 of the present embodiment is configured to use, as the feedback control, proportional-integral (PI) feedback control, but can be configured to use, as the feedback control, another feedback control, such as proportional-derivative (PD) feedback control.

A three-phase converter 74 converts the d- and q-axis voltage commands Vd* and Vq* into three-phase voltage commands Vu*, Vv*, and Vw* in the three-phase stationary coordinate system according to the electrical rotational angle θe and the d- and q-axis voltage commands Vd* and Vq*. The three-phase, i.e. U, V, and W-phase voltage commands Vu*, Vv*, and Vw* of the present embodiment each have a sinusoidal shape, and also have phase differences of 120 electrical degrees therebetween.

A stator generator 75 performs the PWM control based on a cyclic carrier signal, the three-phase voltage commands Vu*, Vv*, and Vw*, and the power supply voltage VDC to thereby generate the drive signals for respectively turning on or off the switches SUp to SWn of the inverter 40.

Specifically, the stator generator 75 divides each of the three-phase voltage commands Vu*, Vv*, and Vw* by VDC/2 to thereby obtain a corresponding one of normalized three-phase voltage commands Vu*, Vv*, and Vw*. Then, the stator generator 75 compares in magnitude each of the normalized three-phase voltage commands Vu*, Vv*, and Vw* with the cyclic carrier signal to accordingly generate, based on the compared results, the drive signals. Note that the normalized value of each of the three-phase voltage commands Vu*, Vv*, and Vw* in the PWM control is equal to or smaller than the amplitude of the cyclic carrier signal.

Note that the two-phase converter 70, stator controller 73, three-phase converter 74, and stator generator 75 correspond to an armature controller.

A field current controller 81 calculates a field voltage command Vf* as a manipulated variable for feedback controlling the field current Ifr measured by the field current detector 52 to the field current command If* obtained from the memory 61.

Specifically, the field current controller 81 subtracts, from the field current command If*, the field current Ifr to accordingly calculate a field current deviation between the field current command If* and the field current If. Then, the field current controller 81 calculates the field voltage command Vf* for feedback controlling the field current deviation to zero.

For example, the field current controller 81 performs the PI feedback control as the feedback control. The field current controller 81 can be configured to use, as the feedback control, another feedback control, such as the PD feedback control.

A field generator 82 divides the field voltage command Vf* by VDC/2 to thereby obtain a corresponding normalized field voltage command Vf*. Then, the field generator 82 performs a comparison in magnitude between the normalized field voltage command Vf* and a triangular signal as the carrier signal, and generates, based on the compared results, field drive signals for the field energization circuit 41; the field drive signals cause a field voltage applied to the field winding 32 to follow the field voltage command Vf*. Note that the field current controller 81 and field generator 82

Figure 3:
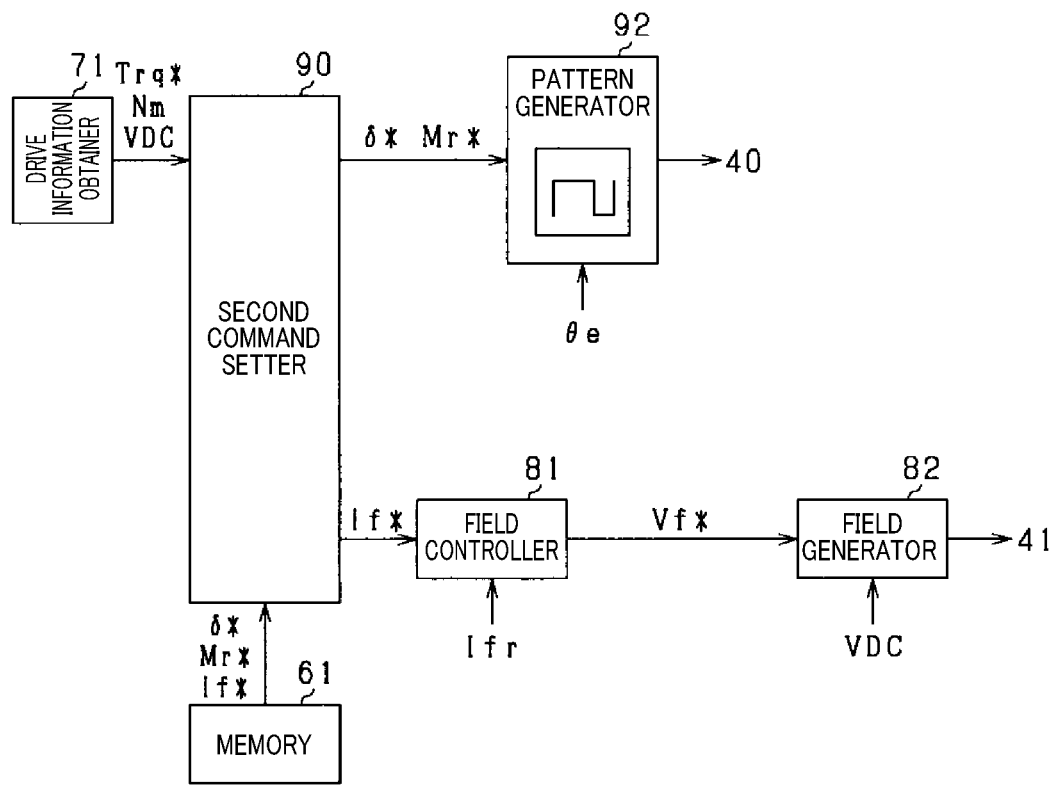
FIG. 3 is a block diagram for performing second torque control based on rectangular-wave control.

Next, the following describes how the control device 60 performs second torque control, i.e. a second torque control mode, illustrated in FIG. 3 upon a value of the modulation factor Mr of the voltage supplied from the inverter 40 to the rotary electric machine 30 being more than the predetermined threshold modulation factor Mα of, for example, 1.

The control device 60 is configured to perform rectangular-wave control (pulse control) to thereby generate drive signals, each of which turns on or off of the corresponding one of the switches Sup to SWn of the inverter 40; the on-off switching operations of the switches Sup to SWn enable the torque Trq of the rotary electric machine 30 to follow the request torque Trq*.

The rectangular-wave control is configured to control on-off switching operations of the switches SUp to SWn of the inverter 40 to such that a single on duration of each of the upper-arm switches SUp to SWp and a single on duration of the corresponding one of the lower-arm switches SUn to SWn appear for each electrical angular cycle of the rotary electric machine 30.

In the memory 61, second setting information is stored; this second setting information includes a correlation among a command voltage phase $\delta^*$, the field current command If*, and the drive information. The command voltage phase $\delta^*$ is defined as a command value of a voltage phase $\delta$ of the voltage vector to be applied to the U-, V-, and W-phase windings 34U, 34V, and 34W for adjusting the torque of the rotary electric machine 30 to the request torque Trq*.

In particular, in the memory 61, a command modulation factor Mr* is stored to correlate with the voltage phase $\delta$. The command modulation factor Mr* is used to define the on duration, which will be referred to as Ton, of each of the switches SUp to SWn of the inverter 40. The on duration of each of the switches SUp to SWn can be set to an electrical angle within a predetermined electrical angular range from 120 degrees to 180 degrees inclusive.

A second command setter 90 sets a value of each of the command voltage phase $\delta$ and the command modulation factor Mr* in accordance with the second setting information and the items of the drive information Trq*, Nm, and VDC such that the value of each of the command voltage phase $\delta$ and the command modulation factor Mr* corresponds to the the second setting information and the items of the drive information Trq*, Nm, and VDC.

A pattern generator 92 generates, based on the command voltage phase $\delta^*$, command modulation factor Mr*, and electrical angle $\theta e$, the drive signals for respectively turning on or off the switches SUp to SWn of the inverter 40; the drive signals drive the rotary electric machine 30 based on the rectangular-wave control.

Specifically, the drive signals generated by the pattern generator 92 enable a single on state of each of the upper-arm switches SUp to SWp and a single on state of the corresponding one of the lower-arm switches SUn to SWn to appear for each electrical angular cycle of the rotary electric machine 30.

The rectangular-wave control is also configured such that switching timings of the respective upper-arm switches SUp to SWp are different from each other by 120 electrical degrees.

Specifically, in the memory 61, pulse patterns are stored; each of the pulse patterns is comprised of 1. A first signal that turns on only each of the upper-arm switches SUp to SWp correlating with a corresponding value of the electrical angle $\theta e$ 2. A second signal that turns on only each of the lower-arm switches SUn to SWn correlating with the corresponding value of the electrical angle $\theta e$ Each of the pulse patterns is stored in the memory 61 to correlate with a corresponding value of the command modulation factor Mr* and a corresponding value of the command voltage phase $\delta^*$.

Specifically, the pattern generator 92 extracts, from the pulse patterns, a pulse pattern corresponding to a value of the command modulation factor Mr* and a value of the command voltage phase $\delta^*$. Then, the pattern generator 92 generates the drive signals for the respective switches SUp and SWn in accordance with the extracted pulse pattern. Note that the pattern generator 92 can generate the drive signals without using the command modulation factor Mr*.

Note that each of the field current controller and the field generator 82 illustrated in FIG. 3 has the same structure as that of the corresponding one of the field current controller and the field generator 82 illustrated in FIG. 2.

Additionally, the control device 60 can be configured to select one of the first torque control illustrated in FIG. 2 and the second torque control illustrated in FIG. 3 in accordance with a value of a parameter that is different from the modulation factor Mr.

For example, the control device 60 can be configured to select one of the first torque control illustrated in FIG. 2 and the second torque control illustrated in FIG. 3 in accordance with 1. Information indicative of a correlation among each region where the selected one of the first torque control and the second torque control should be carried out, a corresponding value of the torque request Trq*, and a corresponding value of the rotational speed Nm 2. A value of the torque request Trq* obtained by the drive information obtainer 71

3. A value of the rotational speed Nm obtained by the drive information obtainer 71

Next, the following describes the first setting information stored in the memory 61.

The first setting information includes selected combinations each including a corresponding value of the current command Id*, a corresponding value of the current command Iq*, and a corresponding value of the current command If* in all allowable combinations of values of the respective current commands Id*, Iq*, and If* that can set upon execution of the first torque control illustrated in FIG. 2. Each of the selected combinations correlates with a corresponding maximum value of an efficiency $\eta$ of the rotary electric machine 30.

The first torque control limits allowable combinations of values of the respective current commands Id*, Iq*, and If*. The For each value of the current commands If* in the allowable combinations, values of the current commands Id* and Iq* are determined such that a corresponding value of the efficiency $\eta$ of the rotary electric machine 30 becomes maximized.

The efficiency $\eta$ of the operating rotary electric machine 30 according to the present embodiment is defined as the ratio of actual power of the rotary electric machine 30 to electrical power supplied to the armature windings 34U, 34V, and 34W of the stator 33 from the battery 20 via the inverter 40.

Specifically, the efficiency η of the rotary electric machine 30 is for example defined by the following equation (1):

$$\eta = Trqr \times Nm \times Me / (VDC \times IDC) \tag{1}$$

where:

1. Trqr represents the torque of the rotary electric machine 30
2. Nm represents the rotational speed of the rotary electric machine 30
3. Me represents a mechanical efficiency of the rotary electric machine 30
4. VDC represents the power supply voltage
5. IDC represents the inverter current IDC Note that, in the equation (1), the torque Trqr of the rotary electric machine 30 can be obtained from the request torque Trq*.

Figure 4:
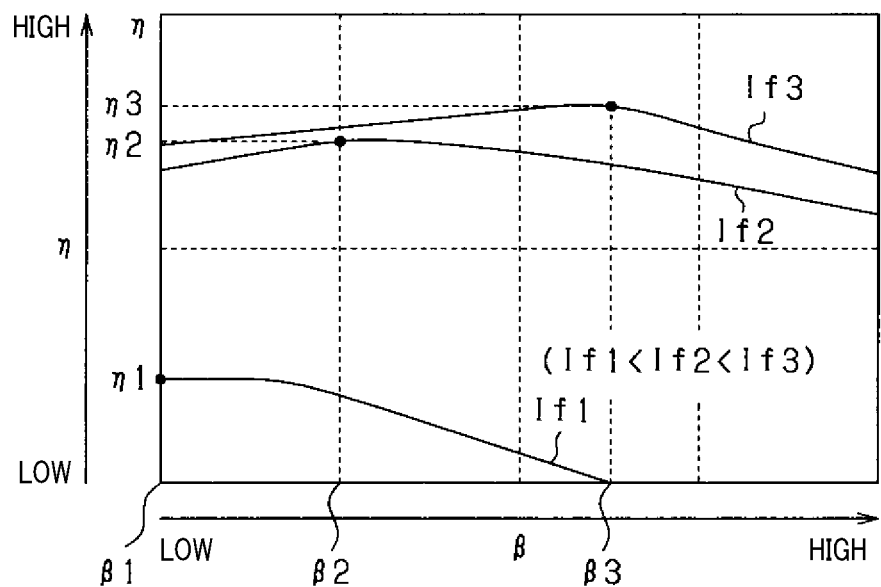
FIG. 4 is a graph used to describe first setting information.

The following describes the allowable combinations of values of the respective current commands Id*, Iq*, and If* with reference to FIG. 4.

FIG. 4 is a graph illustrating

1. A first relationship between a current phase β and the efficiency η when the field current If has a constant first value If1
2. A second relationship between the current phase β and the efficiency η when the field current If has a constant second value If2
3. A third relationship between the current phase β and the efficiency η when the field current If has a constant third value If3

That is, the graph illustrated in FIG. 4 has the current phase β on the horizontal axis thereof, and has the efficiency η on the vertical axis thereof.

The third value If3 of the field current If is higher than the second value If2 of the field current If, and the second value If2 of the field current If is higher than the first value If1 of the field current If.

Reference character η1 represents a maximum value of the efficiency η when the field current If maintains the first value If1, reference character η2 represents a maximum value of the efficiency η when the field current If maintains the second value If2, and reference character η3 represents a maximum value of the efficiency η when the field current If maintains the third value If3.

Note that the current phase β shows the phase of a current vector defined by the d- and q-axis currents Idr and Iqr. The positive direction of the d-axis is set to a reference of zero of the current phase β, and the counter-clockwise direction of the current phase β relative to the reference is defined as a positive direction of the current phase β.

The graph of FIG. 4 shows that

1. The maximum efficiency η1 of the efficiency η is obtained when the current phase β takes a first value β1 while the field current If is maintained to the first value If1
2. The maximum efficiency η2 of the efficiency η is obtained when the current phase β takes a second value β2 while the field current If is maintained to the second value If2
3. The maximum efficiency η3 of the efficiency η is obtained when the current phase β takes a third value β3 while the field current If is maintained to the third value If3

That is, the more the variable of the field current If gradually increases in the order of the first value If1, the second value If2, and the third value If3, the more the variable of the current phase β at which the efficiency η is maximized gradually increases in the order from the first value β1, the second value β2, and the third value β3.

Figure 6A:
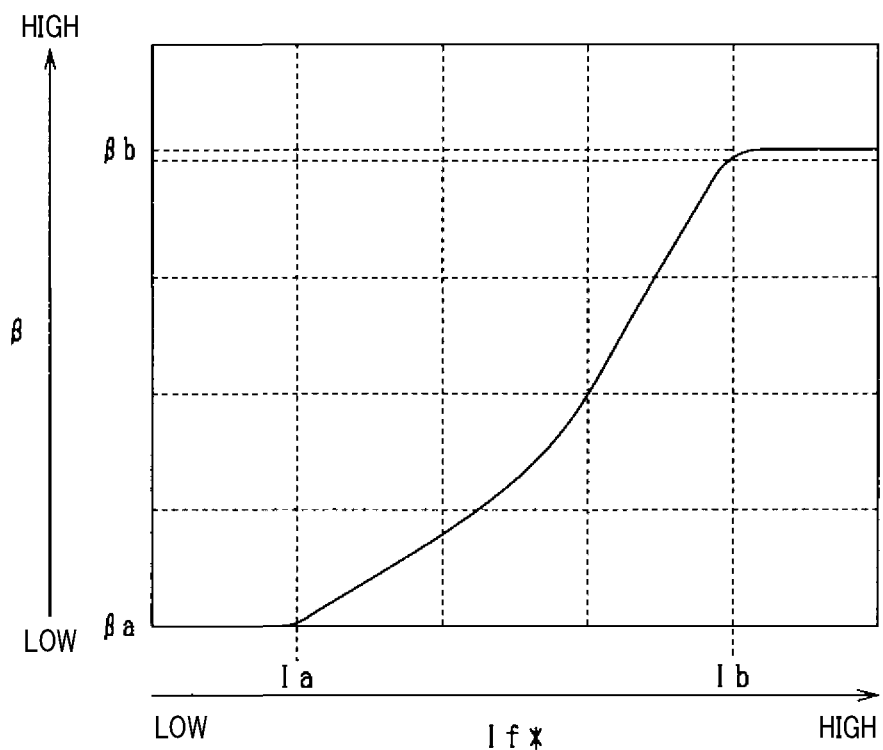
FIGS. 6(a) and 6(b) are graphs, each of which is used to describe the first setting information.
Figure 6B:
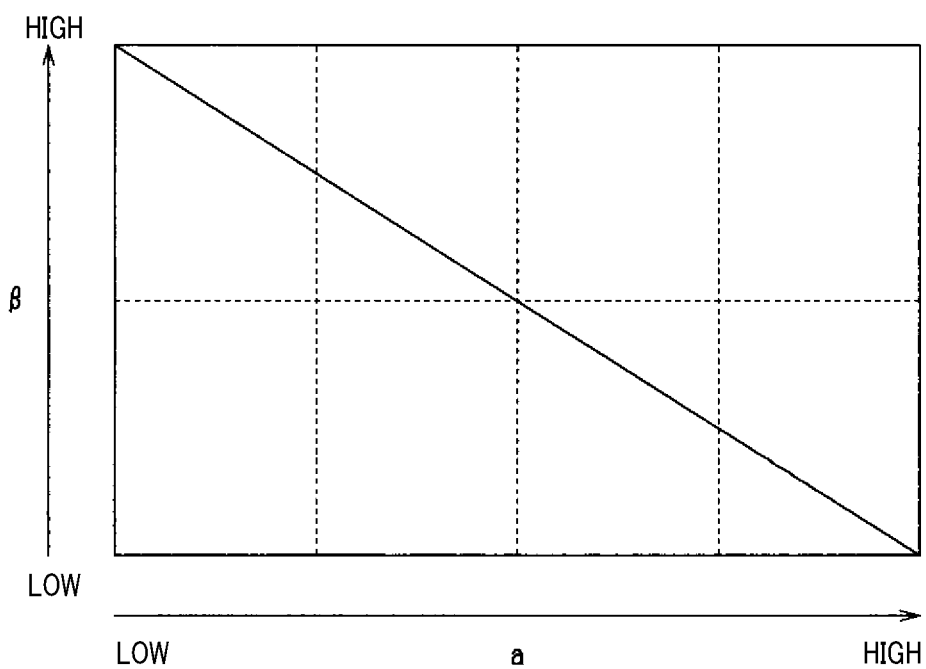

For this reason, as illustrated in FIG. 6(*a*), the first setting information according to the present embodiment includes combinations of the current commands Id*, Iq*, and If; the combinations enable the current phase β to monotonically increase with an increase in the field current If* within a predetermined range from a first current value Ia to a second current value Ib inclusive. Note that, when the field current command If* is equal to or less than the first current value Ia, the current phase β is fixed to a first current-phase value βa. Similarly, note that, when the field current command If* is equal to or more than the second current value Ib, the current phase β is fixed to a second current-phase value βb; the second current-phase value βb is higher than the first current-phase value βa.

Figure 5:
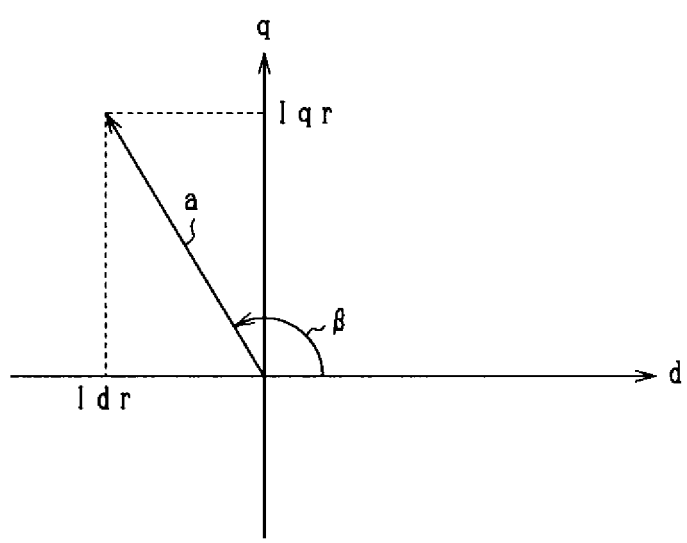
FIG. 5 is a graph used to describe an electrical current phase.

Similarly, as illustrated in FIG. 6(*b*), the first setting information according to the present embodiment includes combinations of the current commands Id*, Iq*, and If; the combinations satisfy that the current phase β increases with a decrease in a current amplitude α; the current amplitude α represents the magnitude of the current vector flowing through the armature windings 34U, 34V, and 34W, and is defined based on the d- and q-axis currents Idr and Iqr (see FIG. 5).

Note that it is assumed that, while the rotary electric machine 30 is driven in a power running mode, the torque Trqr of the rotary electric machine 30 becomes positive. An allowable range within which the current phase β included in the first setting information while the rotary electric machine 30 is driven in the power running mode is defined based on combinations of the current commands Id* and Iq* that cause the torque Trqr to be a positive value.

Next, the following describes the second setting information stored in the memory 61.

The second setting information includes selected combinations each including a corresponding value of the command voltage phase δ*, a corresponding value of the command modulation factor Mr*, and a corresponding value of the current command If* in all allowable combinations of values of the respective command variables δ*, Mr*, and If* that can set upon execution of the second torque control illustrated in FIG. 3. Each of the selected combinations correlates with a corresponding maximum value of the efficiency η of the rotary electric machine 30.

Figure 7:
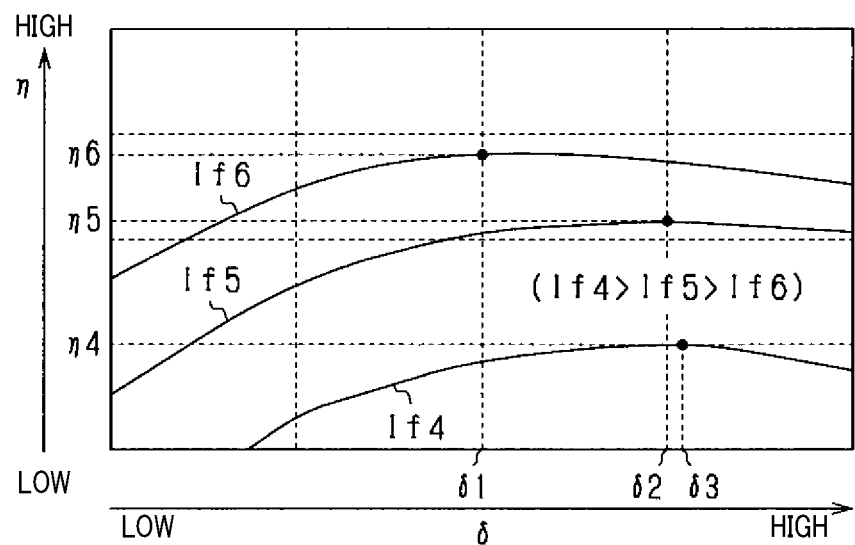
FIG. 7 is a graph used to describe second setting information.
Figure 8:
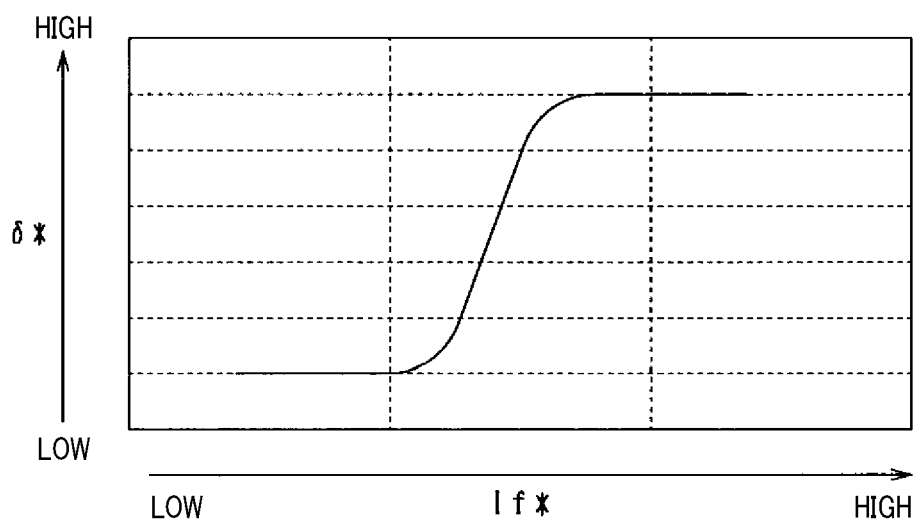
FIG. 8 is a graph used to describe the second setting information.

The following describes the allowable combinations of values of the respective command variables δ*, Mr*, and If* with reference to FIGS. 7 and 8.

FIG. 7 is a graph illustrating

1. A first relationship between the command voltage phase δ* and the efficiency η when the field current If has a constant fourth value If4
2. A second relationship between the command voltage phase δ* and the efficiency η when the field current If has a constant fifth value If5
3. A third relationship between the command voltage phase δ* and the efficiency η when the field current If has a constant sixth value If6

That is, the graph illustrated in FIG. 7 has the command voltage phase δ* on the horizontal axis thereof, and has the efficiency η on the vertical axis thereof.

The sixth value If6 of the field current If is lower than the fifth value If5 of the field current If, and the fifth value If5 of the field current If is lower than the fourth value If4 of the field current If.

Reference character η4 represents a maximum value of the efficiency η when the field current If maintains the fourth value If4, reference character η5 represents a maximum value of the efficiency η when the field current If maintains the fifth value If5, and reference character η6 represents a maximum value of the efficiency η when the field current If maintains the sixth value If6.

The following describes the second setting information while focusing on the command voltage phase δ* and the command field current If*.

The graph of FIG. 7 shows that

1. The maximum efficiency η6 of the efficiency η is obtained when the command voltage δ takes a first value δ1 while the field current If is maintained to the sixth value If6

2. The maximum efficiency η5 of the efficiency η is obtained when the command voltage δ takes a second value δ2 while the field current If is maintained to the fifth value If5

3. The maximum efficiency η4 of the efficiency η is obtained when the command voltage δ takes a fourth value δ3 while the field current If is maintained to the fourth value If4

That is, the more the variable of the field current If gradually increases in the order of the sixth value If6, the fifth value If5, and the fourth value If4, the more the variable of the voltage phase δ at which the efficiency η is maximized gradually increases in the order from the first value δ1, the second value δ2, and the fourth value δ4.

For this reason, as illustrated in FIG. 8, the second setting information according to the present embodiment includes combinations of the command variables δ* and If; the combinations satisfy that the command voltage phase δ* increases with an increase in the field current If*.

Note that the allowable range within which the command voltage phase δ* included in the second setting information while the rotary electric machine 30 is driven in the power running mode is defined as a range of the command voltage phase δ* that causes the torque Trqr to be a positive value.

Figure 9:
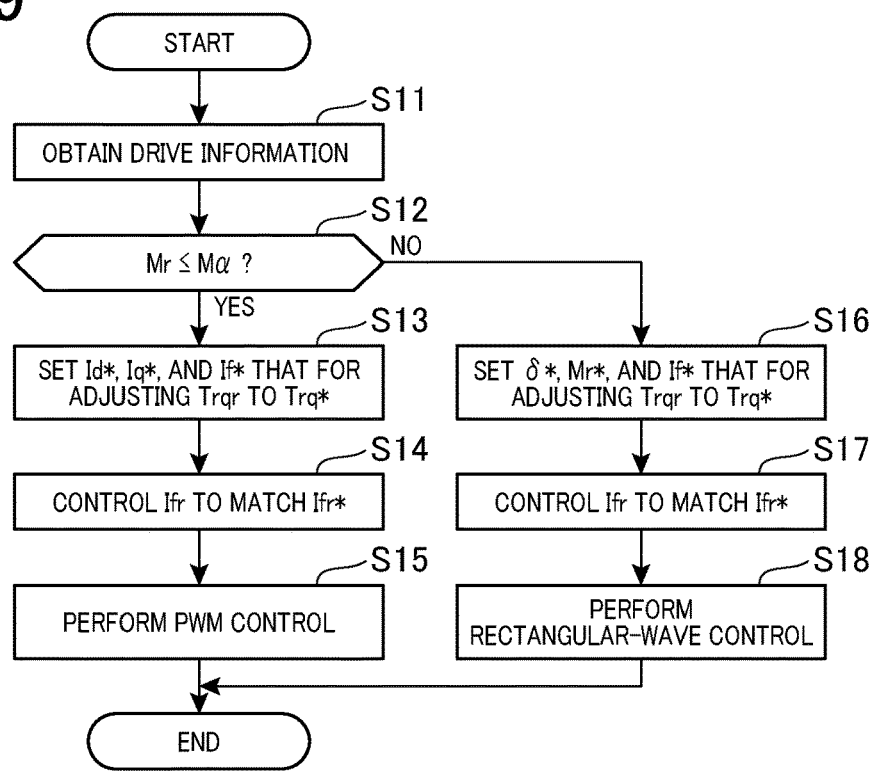
FIG. 9 is a flowchart schematically illustrating a torque control routine.

Next, the following describes a torque control routine carried out by the control device 60 using the first setting information and the second setting information with reference to FIG. 9. The control device 60 is configured to repeatedly carry out the torque control routine.

In step S11, the control device 60 obtains, as the drive information, the request torque Ttq*, the rotational speed Nm, and the power supply voltage VDC.

In step S12, the control device 60 determines whether a value of the modulation factor Mr is equal to or less than the threshold modulation factor Mα.

Upon determining that the value of the modulation factor Mr is equal to or less than the threshold modulation factor Mα (YES in step S12), the torque control routine proceeds to step S13.

In step S13, the control device 60 reads, from the first setting information stored in the memory 61, values of the current commands Id*, Iq*, and IP; these values of the current commands Id*, Iq*, and If* correlate with the value of each of the drive information items Trq*, Nm, and VDC. Then, in step S13, the control device 60 sets the values of the current commands Id*, Iq*, and If* as values of command parameters for controlling the torque of the rotary electric machine 30.

Following the operation in step S13, the control device 60 drives the field energization circuit 41 such that a value of the field current If flowing through the field winding 32 matches the value of the field current command If* set in step S14. Specifically, the control device 60 causes the field current controller 81 and the field generator 82 to perform feedback control of the value of the field current If to match the field current command If* in step S14.

Following the operation in step S14, the control device 60 performs the PWM control of the inverter 40 such that a value of the torque Trq of the rotary electric machine 30 matches the value of the request torque Trq* in step S15. Specifically, the control device 60 causes the stator controller 73, the three-phase converter 74, and the stator generator 75 to perform feedback control of the values of the d- and q-axis currents Idr and Iqr to match the values of the respective d- and q-axis current commands Idr* and Iqr* set in step S13, thus obtaining the d- and q-axis voltage commands Vd* and Vq*.

Then, the control device 60 causes the three-phase converter 74 to convert the d- and q-axis voltage commands Vd* and Vq* into the three-phase voltage commands Vu*, Vv*, and Vw* in step S15. Thereafter, the control device 60 causes the stator generator 75 to perform sinusoidal PWM control based on the carrier signal, three-phase voltage commands Vu*, Vv*, and Vw* and power supply voltage VDC, thus generating the drive signals for on-off switching operations of the respective switches SUp to SWn of the inverter 40 in step S15.

Otherwise, upon determining that the value of the modulation factor Mr is more than the threshold modulation factor Mα (NO in step S12), the torque control routine proceeds to step S16.

In step S16, the control device 60 reads, from the second setting information stored in the memory 61, values of the command variables δ* Mr*, and If*; these values of the command variables δ* Mr*, and If* are used to adjust the torque Trqr of the rotary electric machine 30 to the request torque Trq*. Then, in step S16, the control device 60 sets the values of the command variables δ* Mr*, and If* as values of command parameters for controlling the torque Trqr of the rotary electric machine 30 to the request torque Trq*.

In step S17, the control device 60 drives the field energization circuit 41 such that a value of the field current If flowing through the field winding 32 matches the value of the field current command If* set in step S16.

Following the operation in step S17 the control device 60 performs the rectangular-wave control of the inverter 40 such that a value of the torque Trq of the rotary electric machine 30 matches the value of the request torque Trq* in step S18. Specifically, the control device 60 causes the pattern generator 92 to generate, based on the electrical angle θe, the value of the command voltage phase δ*, and the value of the command modulation factor Mr*, the drive signals for the respective switches SUp to SWn of the inverter 40; the values of the command voltage phase δ* and the command modulation factor Mr* have been set in step S16. The drive signals drive the rotary electric machine 30 based on the rectangular-wave control.

After completion of the operation in step S15 or step S18, the control device 60 terminates the torque control routine illustrated in FIG. 9.

Figure 10A:
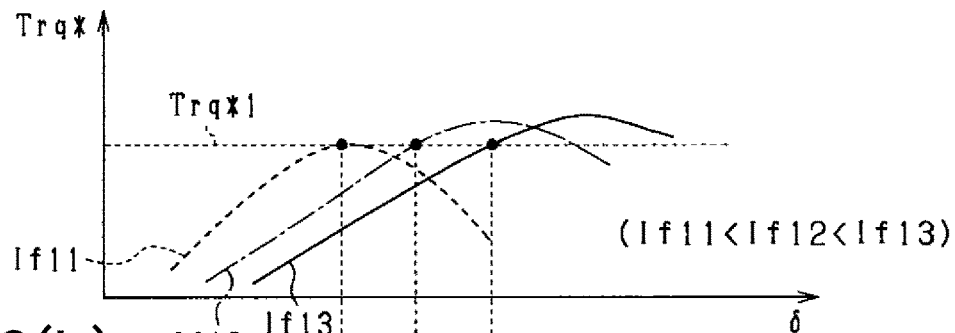
FIGS. 10(a) and 10(b) are graphs, each of which is used to describe how the first embodiment works.
Figure 10B:
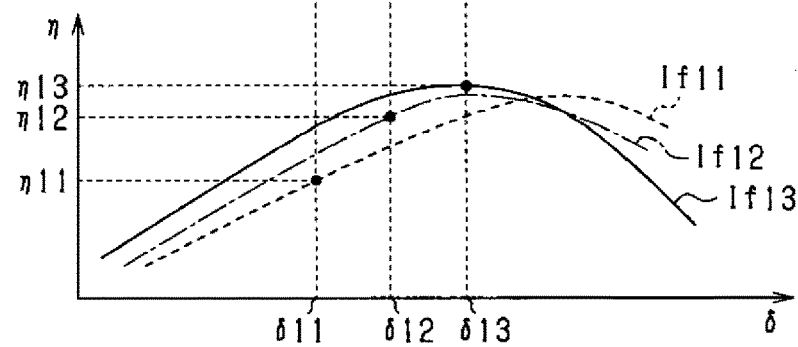

Next, the following describes benefits associated with the present embodiment with reference to FIGS. 10(a) and 10(b).

FIG. 10(a) is a graph illustrating

1. A first relationship between the voltage phase δ and the request torque Trq* when the field current If has a constant value If11

2. A second relationship between the voltage phase δ and the request torque Trq* when the field current If has a constant value If12

3. A third relationship between the voltage phase δ and the request torque Trq* when the field current If has a constant value If13

FIG. 10(b) is a graph illustrating

1. A fourth relationship between the voltage phase δ and the efficiency η when the field current If maintains the value If11
2. A fifth relationship between the voltage phase δ and the efficiency η when the field current If maintains the value If12
3. A third relationship between the voltage phase δ and the efficiency η when the field current If maintains the value If13

Note that the value If13 of the field current If is higher than the value If12 of the field current If, and the value If12 of the field current If is higher than the value If11 of the field current If.

Let us assume that the control device 60 adjusts the torque Trqr of the rotary electric machine 30 to the request torque Trq*.

In this assumption, FIG. 10(a) shows a first combination of a value δ11 of the voltage phase δ and the value If11 of the field current If, which is expressed as (δ11, If11), a second combination of a value δ12 of the voltage phase δ and the value If12 of the field current If, which is expressed as (δ12, If12), and a third combination of a value δ13 of the voltage phase δ and the value If13 of the field current If, which is expressed as (δ13, If13); each of the first to third combinations enables the control device 60 to adjust the torque Trqr of the rotary electric machine 30 to the request torque Trq*.

In this assumption, the combination of a selected value of the command voltage phase δ* and a selected value of the field current command If*, which enables the voltage phase δ and the field current If to be adjusted to the respective values δ13 and If13, is stored as the second setting information in the memory 61 to correlate with the request torque Trq*.

In contrast, the combination of a selected value of the command voltage phase δ* and a selected value of the field current command If*, which enables the voltage phase δ and the field current If to be adjusted to the respective values δ11 and If11, represents a first comparative example, and is not stored in the memory 61 as the second setting information. Similarly, the combination of a selected value of the command voltage phase δ* and a selected value of the field current command If*, which enables the voltage phase δ and the field current If to be adjusted to the respective values δ12 and If12, represents a second comparative example, and is not stored in the memory 61 as the second setting information.

That is, the control device 60 adjusts, based on the second setting information, the voltage phase δ to the value δ13 and the field current If to the value If13, resulting in the control device 60 driving the rotary electric machine 30 with the maximum value η13 of the efficiency η.

In contrast, the control device 60 adjusts the voltage phase δ to the value δ11 and the field current If to the value If11, resulting in the control device 60 driving the rotary electric machine 30 with the value η11 of the efficiency η, which is lower than the maximum value η13 of the efficiency η. Similarly, the control device 60 adjusts the voltage phase δ to the value δ12 and the field current If to the value If12, resulting in the control device 60 driving the rotary electric machine 30 with the value η12 of the efficiency η, which is lower than the maximum value η13 of the efficiency η.

The present embodiment described set forth above achieves the following effects.

The control device 60 is configured to set, based on the first setting information, a value of each of the command variables Id*, Iq*, and If* in accordance with the request torque Trq*; the value of each of the commands Id*, Iq*, and If* enables the control device 60 to drive the rotary electric machine 30 a maximum value of its efficiency η. That is, the control device 60 is configured to perform the PWM control to thereby control drive of the rotary electric machine 30 efficiently in accordance with the request torque Trq*.

The control device 60 is configured to set, based on the second setting information, a value of each of the command variables δ* and If* in accordance with the request torque Trq*; the value of each of the commands Id*, Iq*, and If* enables the control device 60 to drive the rotary electric machine 30 with a maximum value of its efficiency η. That is, the control device 60 is configured to perform the rectangular-wave control to thereby control drive of the rotary electric machine 30 efficiently in accordance with the request torque Trq*.

Other Embodiments

Values of each of the command variables Id*, Iq*, and If* included in the first setting information can be stored in the memory 61 to correlate with only corresponding values of the request torque Trq*. Similarly, values of each of the command variables δ* and Mr* included in the second setting information can be stored in the memory 61 to correlate with only corresponding values of the request torque Trq*.

In the first torque control illustrated in FIG. 2, the first setting information can be stored in the memory 61; the first setting information include values of the current amplitude α, corresponding values of the current phase β, corresponding values of the field current command If*, and corresponding values of each item of the drive information, which correlate with one another. The control device 60 according to this modification can be configured to set a combination of values of the respective d- and q-axis current commands Id* and Iq*, which correspond to a value of the current phase β in step S13.

The present disclosure can be applied to the control device 60 that drives the rotary electric machine 30 in a regenerative drive mode. Note that it is assumed that, while the rotary electric machine 30 is driven in the regenerative drive mode, the torque Trqr of the rotary electric machine 30 becomes negative. For example, an allowable range within which the current phase β included in the first setting information while the rotary electric machine 30 is driven in the regenerative drive mode can be defined based on combinations of the current commands Id* and Iq* that cause the torque Trqr to be a negative value.

The characteristics of the rotary electric machine 30 are not limited to the characteristics illustrated in FIGS. 4, 6, 7, and 8.

In the second setting information, the command voltage phase δ* can only correlate with the drive information. In this modification, the command modulation factor Mr* can be set to a fixed value.

The current phase β in the two-phase rotation coordinate system can be defined such that the positive direction of the d-axis is set to the reference of zero of the current phase β, and the counter-clockwise direction of the current phase β relative to the reference is defined as a negative direction of the current phase β. In this modification, the first setting information can include combinations of the current commands Id*, Iq*, and If; the combinations enable the field current Ifr to increase with a monotonic decrease in the current phase β.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a rotary electric machine, the apparatus being applicable to a control system that includes a rotary electric machine and a power converter, the rotary electric machine including a field winding provided to a rotor, and an armature winding provided to a stator, the power converter being configured to supply alternating-current power to the rotary electric machine to thereby drive the rotary electric machine, the apparatus comprising:
    a storage unit that stores setting information including a correlation between:
        a combination of an armature related command and a field current command; and
        drive information including request torque,
    the armature related command being a command for a current flowing through the armature winding or a voltage applied to the armature winding,
    the setting information enabling torque of the rotary electric machine to be adjusted to the request torque;
    a drive information obtainer configured to obtain the drive information;
    a command setter configured to set a value of the field current command and a value of the armature related command in accordance with the drive information obtained by the drive information obtainer and the setting information stored in the storage unit, the value of the field current command and the value of the armature related command set by the command setter corresponding to the obtained drive information;
    a field controller configured to control a field current flowing through the field winding to the value of the field current command set by the command setter; and
    an armature controller configured to control the current flowing through the armature winding or the voltage applied to the armature winding to the value of the armature related command set by the command setter.

2. The apparatus according to claim 1, wherein:
the combination included in the setting information correlating with the drive information includes at least one selected combination in all allowable combinations of values of the armature related command and the field winding command,
the at least one selected combination being a combination of a corresponding value of the armature related command and a corresponding value of the field winding command,
the at least one selected combination enabling the rotary electric machine to be driven with a maximum value of an efficiency of the rotary electric machine.

3. The apparatus according to claim 1, wherein:
the armature winding comprises three-phase windings;
the armature controller is configured to:
    convert phase currents in a three-phase stationary coordinate system flowing through the respective three-phase windings of the armature winding as the armature current into a d-axis current and a q-axis current in a two-phase rotation coordinate system; and
    adjust, based on the drive information, the d-axis current and q-axis current to thereby adjust the torque of the rotary electric machine to the request torque; and
the armature related command includes
    a first current command for adjusting the d-axis current to a first value correlating with the request torque; and
    a second current command for adjusting the q-axis current to a second value correlating with the request torque.

4. The apparatus according to claim 2, wherein:
the armature winding comprises three-phase windings;
the armature controller is configured to:
    convert phase currents in a three-phase stationary coordinate system flowing through the respective three-phase windings of the armature winding as the armature current into a d-axis current and a q-axis current in a two-phase rotation coordinate system; and
    adjust, based on the drive information, the d-axis current and q-axis current to thereby adjust the torque of the rotary electric machine to the request torque; and
the armature related command includes
    a first current command for adjusting the d-axis current to a first value correlating with the request torque; and
    a second current command for adjusting the q-axis current to a second value correlating with the request torque.

5. The apparatus according to claim 3, wherein:
the setting information includes combinations of values of the field current command and corresponding values of the armature related command, the combinations enabling a current phase to monotonically increase with an increase in the field current,
the phase current being defined based on the d-axis current and the q-axis current.

6. The apparatus according to claim 4, wherein:
the setting information includes combinations of values of the field current command and corresponding values of the armature related command, the combinations enabling a current phase to monotonically increase with an increase in the field current,
the phase current being defined based on the d-axis current and the q-axis current.

7. The apparatus according to claim 1, wherein:
the power converter comprises:
    an upper-arm switch; and
    a lower-arm switch connected in series to the upper-arm switch;
the armature controller is configured to drive the power converter based on rectangular-wave control, the rectangular-wave control being configured to control on-off switching operations of the upper- and lower-arm switches such that a single on duration of the upper-arm switch and a single on duration of the lower-arm switch appear for at least one electrical angular cycle of the rotary electric machine; and
the armature related command defines a phase of an output voltage of the power converter, the phase of the output voltage being a parameter required to drive the power converter based on the rectangular-wave control.

8. The apparatus according to claim 7, wherein:
the setting information includes combinations of values of the field current command and corresponding values of the armature related command, the combinations enabling the phase of the output voltage to monotonically increase with an increase in the field current.

* * * * *